US 6,716,129 B2

(12) United States Patent
Bott et al.

(10) Patent No.: US 6,716,129 B2
(45) Date of Patent: Apr. 6, 2004

(54) TRANSMISSION DECOUPLING DEVICE

(75) Inventors: Francois Bott, Ottrott (FR); Yves Lauber, Bischwiller (FR); Eric Laguna, Strasbourg (FR); Pascal Marques-Bras, Geispolsheim Village (FR); Marc Andres, Schiltigheim (FR); Jean-Daniel Kiefer, Illkirch (FR)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/982,512

(22) Filed: Oct. 18, 2001

(65) Prior Publication Data
US 2002/0091036 A1 Jul. 11, 2002

(30) Foreign Application Priority Data
Oct. 19, 2000 (GB) .............................................. 0025664

(51) Int. Cl.[7] .............................................. F16H 37/02
(52) U.S. Cl. ........................... 475/210; 475/116; 474/28
(58) Field of Search ................................. 475/210, 212, 475/213, 214, 215, 216, 217, 219, 116, 138; 74/329, 343, 372; 474/1, 28, 73, 38

(56) References Cited
U.S. PATENT DOCUMENTS

| 4,458,318 A | | 7/1984 | Smit et al. .................. 364/424 |
|---|---|---|---|
| 4,482,339 A | * | 11/1984 | Miki et al. ..................... 474/28 |
| 4,484,493 A | | 11/1984 | Yamamuro et al. ........... 74/689 |
| 4,583,423 A | | 4/1986 | Hahne ......................... 74/689 |
| 4,823,648 A | * | 4/1989 | Hayakawa et al. ..... 475/119 X |
| 4,950,213 A | * | 8/1990 | Morisawa ............... 475/210 X |
| 5,014,566 A | | 5/1991 | Kashiwase ................... 74/331 |
| 5,035,310 A | * | 7/1991 | Meyerle .................... 192/48.5 |
| 5,176,579 A | * | 1/1993 | Ohsono et al. ................ 474/1 |
| 5,788,038 A | * | 8/1998 | Hickey et al. .......... 475/138 X |
| 6,217,473 B1 | * | 4/2001 | Ueda et al. ................. 475/216 |
| 6,332,856 B1 | * | 12/2001 | Iwamoto ..................... 475/210 |

FOREIGN PATENT DOCUMENTS

JP          2002/9054     *  8/2000

* cited by examiner

Primary Examiner—Ha Ho
(74) Attorney, Agent, or Firm—Leslie C. Hodges

(57) ABSTRACT

A vehicle transmission, for example a CVT transmission, is provided with a decoupling device between an engine output shaft and a vehicle driveline. The decoupling device in one embodiment includes a clutch assembly which is fixed to a shaft coupled to the transmission output and engageable with a driveline through a piston arrangement. The piston can be urged against the force of a spring by fluid pressure to cause engagement of the clutches of the clutch assembly and thereby to couple engine torque to the vehicle driveline. When fluid pressure is released, the spring urges the piston to a position in which the clutches of the clutch assembly are disengaged, so as to disengage the engine output from the vehicle driveline. In the disengaged state, the vehicle can be towed.

8 Claims, 3 Drawing Sheets

TRANSMISSION DECOUPLING DEVICE

TECHNICAL FIELD

The present invention relates to a transmission and more particularly to a decoupling device for decoupling the transmission from the vehicle driveline. The invention is particularly suited to continuously variable transmissions (CVT) and automatic transmissions.

BACKGROUND OF THE INVENTION

Most CVT transmissions remain engaged irrespective of the state of the vehicle, and this can cause problems with towing of such vehicles and possible transmission damage.

SUMMARY OF THE INVENTION

According to an aspect of the present invention, there is provided a transmission assembly including an output shaft, a vehicle driveline, a decoupling device for disconnecting the vehicle driveline from the output shaft, the output shaft including a conduit for the supply of control fluid to the decoupling device, the decoupling device including at least one component located on or in the output shaft and controlled by fluid pressure provided through said conduit.

According to another aspect of the present invention, there is provided a vehicle including an engine and a transmission assembly as herein specified, wherein the conduit is coupled to the vehicle engine such that control fluid therein is pressurized on the basis of engine output.

In the preferred embodiment, the transmission is a CVT transmission, in which case the decoupling device preferably disconnects the driven pulley from the vehicle driveline.

Advantageously, the decoupling device is located between a driven pulley and a final drive gear to disconnect the driven pulley from the vehicle driveline.

In an alternative embodiment, the transmission is an automatic transmission having discrete gear ratios.

In the preferred embodiment, there is provided means for operating the decoupling device when the engine is stopped and/or no pressure is available.

The present invention provides improved towing performance and can prevent transmission damage of a vehicle being towed. The preferred embodiments do not significantly add to the size of a conventional transmission.

BRIEF DESCRIPTION OF THE DRAWINGS

Embodiments of the present invention are described below, with reference to the accompanying drawings, in which.

DESCRIPTION OF THE PREFERRED EMBODIMENT

Figure 1:
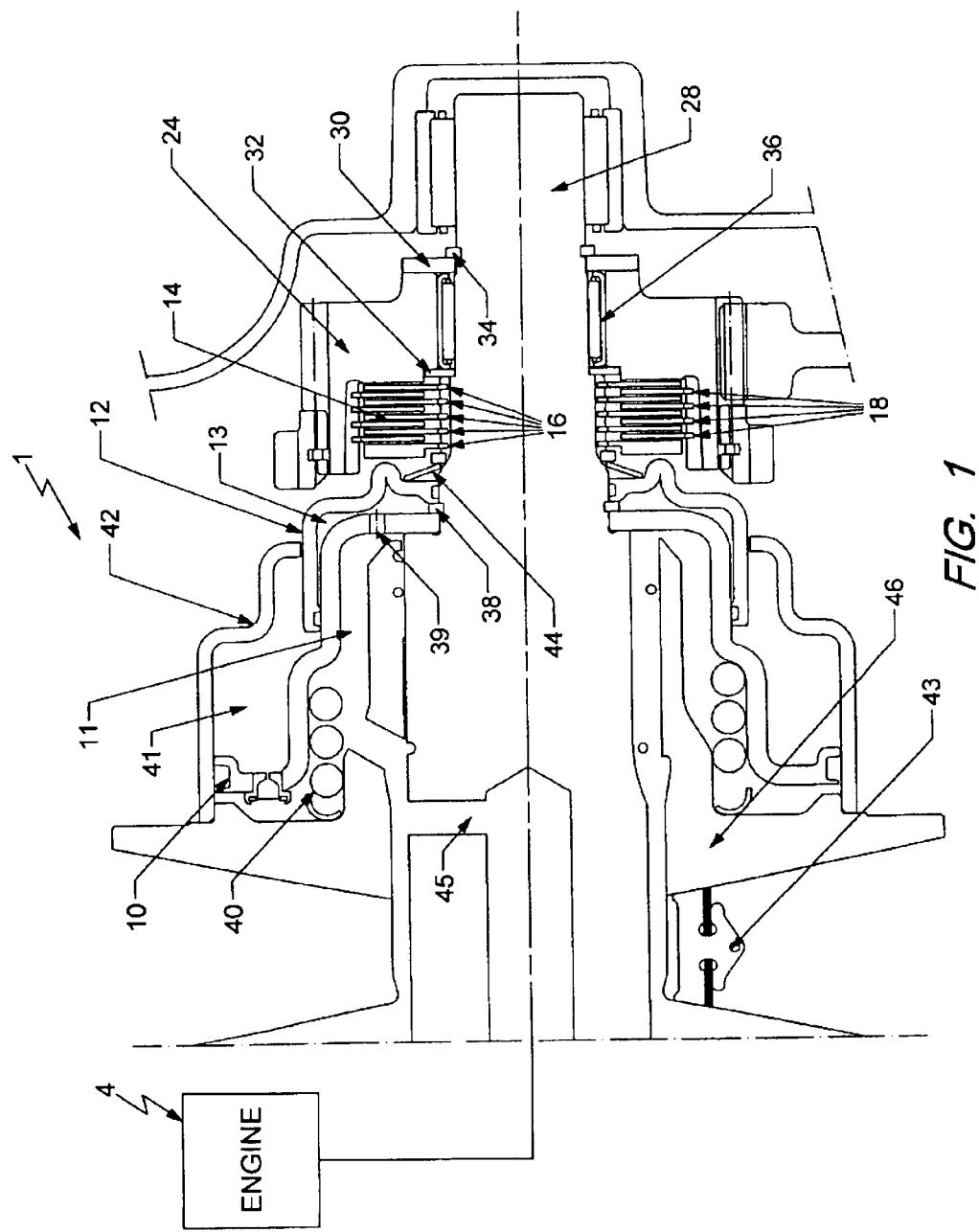
FIG. 1 is a cross-sectional view of a CVT transmission incorporating an embodiment of decoupling device.

The embodiment shown in FIG. 1 relates to a continuously variable transmission (CVT) in which a decoupling device 1 is installed between the driven pulley and the final drive gear to disconnect the driven pulley from the vehicle driveline when engine 4 is not running and no pressure is available. This is to prevent wear of the pulleys and belt system during vehicle towing and to facilitate vehicle movement in case of engine failure.

This embodiment includes a driven pulley sheave dual piston 10, 12, 42, that expands both ways:

a) on one side to provide clamping force required to prevent slippage of the belt 43, and b) on the other side to provide the apply force of a multi-plate clutch connecting the sheave to the final drive gear.

The multi-plate clutch is noiseless at engagement and provides high torque capacity in minimum space with the dual piston concept.

The system is able to accept some abuse maneuver, such as applying the clutch with no clunk or rattle noise when the vehicle moves, for example if the engine is started when the vehicle is already moving on a slope.

Referring to FIG. 1, the transmission includes a driven sheave dual piston consisting of first and second piston elements 10 and 12. The piston elements 10 and 12 can reciprocate in two opposite directions for coupling and decoupling purposes, as is described below. The first piston element 10 provides the clamping force to the CVT belt 43 through sheave elements 42 and 46. The smaller second piston element 12 overlaps the first piston element 10 and provides the apply force to the clutch pack 14 clamped between the piston and the final drive gear 24.

The clutch pack 14 is preferably formed of a multi-plate clutch of thin steel plates and friction elements. The drive elements 16 of the clutch pack 14, which are the friction plates in this example, are connected by splines to the shaft 28.

The driven elements 18 of the clutch pack 14 are connected preferably by splines to the gear 24, combined with the parking gear in this example.

The gear 24 is also supported by roller bearings 36 to allow free rotation on the shaft 28 when clutch pack 14 is released. The gear 24 is located axially on the shaft 28 by two washers 30, 32 and snap ring 34.

The first piston element 10 is held against retaining ring 38 by the force of coil spring 40 and/or by coupling pressure. Orifices 39 in the first piston element 10 connect the pressure chambers 11, 13 of the first piston element 10 and second piston element 12.

In the preferred arrangement, the outside diameter of the second piston element 12 is optionally constructed such as to provide a cylindrical element which acts to close the chamber 41 of dynamic pressure compensator 42 by tight adjustment.

A return spring 44, a waved or conical spring in the preferred arrangement, maintains second piston element 12 against the snap ring 38 when there is no pressure applied.

A conduit path 45 in shaft 28 and orifices 39 in piston element 10 allow fluid to be passed to and from chambers 11, 13.

In normal operating conditions, fluid pressure in the conduit assembly 45 biases the piston element 12 against the clutch pack 14 with sufficient clamping load to prevent clutch pack 14 from slipping and thus causes the gear 24 to be locked to the shaft 28.

When it is desired to disconnect the vehicle driveline from the output shaft such as, for example, when the engine is stopped and no pressure is available in the transmission, fluid pressure within chamber 13 is allowed to vent through orifices 39 and conduit 45. This allows the spring 44 to move the piston 12 away from the clutch pack 14, thus causing the release of the clutch pack 14. As a result, the output shaft 28 is disconnected from the gear 24 and thereby from the vehicle driveline.

When the transmission returns to normal operating conditions, such as for example when the engine is running, fluid pressure is available in chambers 11, 13 through conduit 45 and orifices 39, thus causing clutch pack 14 to be applied and vehicle driveline to be connected to the output shaft 28 of the transmission without delay.

Figure 2:
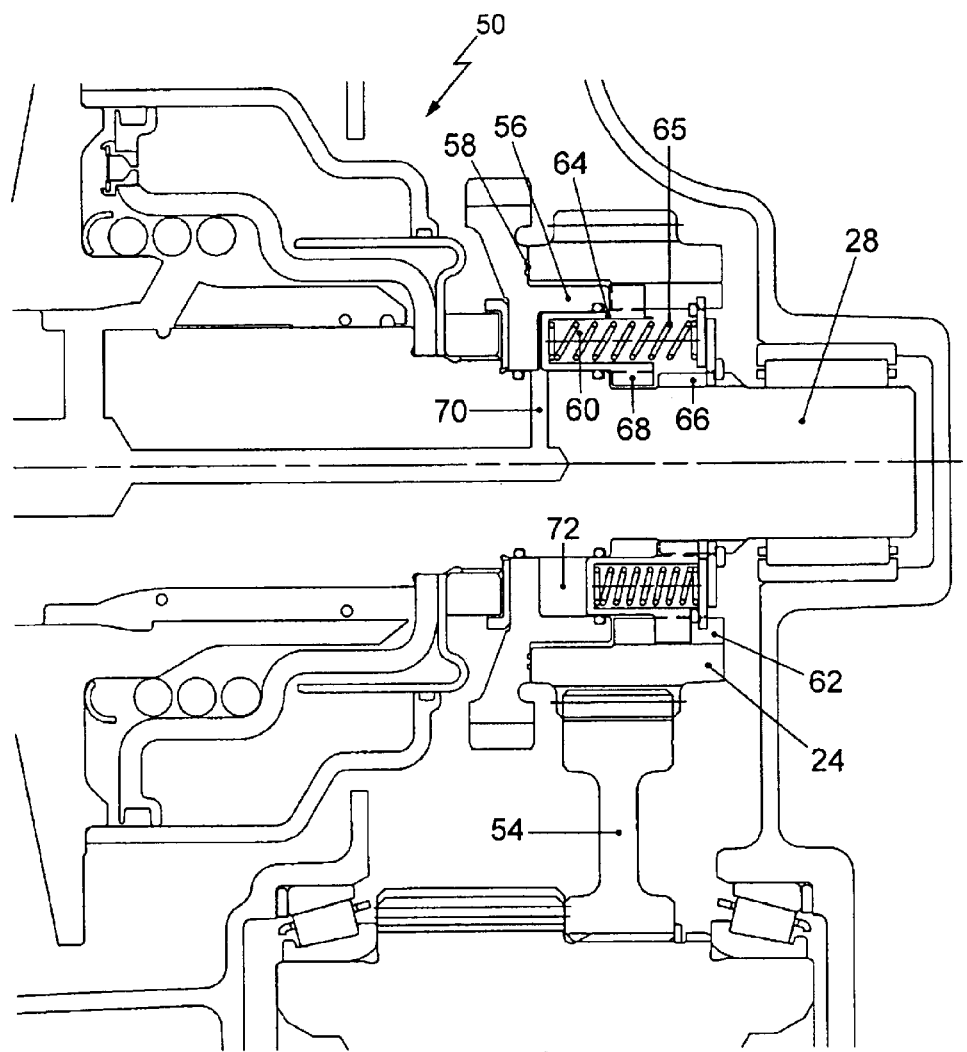
FIG. 2 is a cross-sectional view of a CVT transmission incorporating another embodiment of decoupling device.

Referring now to FIG. 2, there is shown an automatic transmission incorporating an embodiment of decoupling device 50. The upper half of FIG. 2 shows the decoupling device with no fluid pressure applied, while the lower half of FIG. 2 shows the decoupling device with fluid pressure applied.

Shaft element 28 of the decoupling device 50 is coupled to the transmission output, preferably the driven pulley shaft, while element 24, the final drive gear in this example, is coupled to the vehicle driveline. Piston support 56 is linked to driveline element 24 by a permanent mechanical link 58, such as splines (not shown) and/or welding so as to rotate therewith.

A piston 64 is also mechanically engaged to gear element 24 by means of splines 62 but in such a manner that the piston 64 can reciprocate in a longitudinal direction relative to the piston support 56. Moreover, the piston 64 is able to reciprocate along the shaft element 28.

As will be apparent in FIG. 2, within the piston 64 there are provided a plurality of housing elements 60 in each of which there is located a coil spring 65. The coil springs 65 together bias the piston 64 to the left in the Figure when there is no fluid pressure, as explained below.

The shaft element 28 is provided with a plurality of splines 66 which can engage corresponding splines 68 on the piston 64 but only when the piston is in a compressed condition as shown in the lower half of FIG. 2.

However, the splines 66 and 68 are designed not to mesh together when the piston 64 is in its extended position, shown in the upper half of FIG. 2.

Within shaft element 28 there is provided a conduit 70 linked to a chamber 72 formed between the top of the piston 64, the piston support 56, and the shaft element 28.

In use, when it is desired to disconnect the engine output from the vehicle driveline, fluid pressure within the conduit 70 is removed, by suitable venting. This causes a loss of pressure in chamber 72, which allows the coil springs 65 to move the piston 64 to its extended position, that is, to the leftmost position shown in the top half of FIG. 2. In so doing, the splines 66 and 68 become disengaged, allowing the driveline element 54, the gear element 24, the piston support 56 and the piston 64 to rotate freely relative to the shaft 28 and thus the engine output. Hence, the vehicle driveline is disconnected from the engine output and no torque transfer is possible.

On the other hand, when drive is required, fluid pressure is built up in the conduit 70 and hence in the chamber 72. This force acts against the coil springs 65 and urges the piston 64 into its retracted position, shown in the bottom half of FIG. 2. In so doing, the splines 66 and 68 become engaged and the shaft 28, and hence the vehicle output shaft becomes engaged with the vehicle driveline through the driveline element 54 and gear element 24 and torque transfer to the vehicle driveline is enabled.

Figure 3:
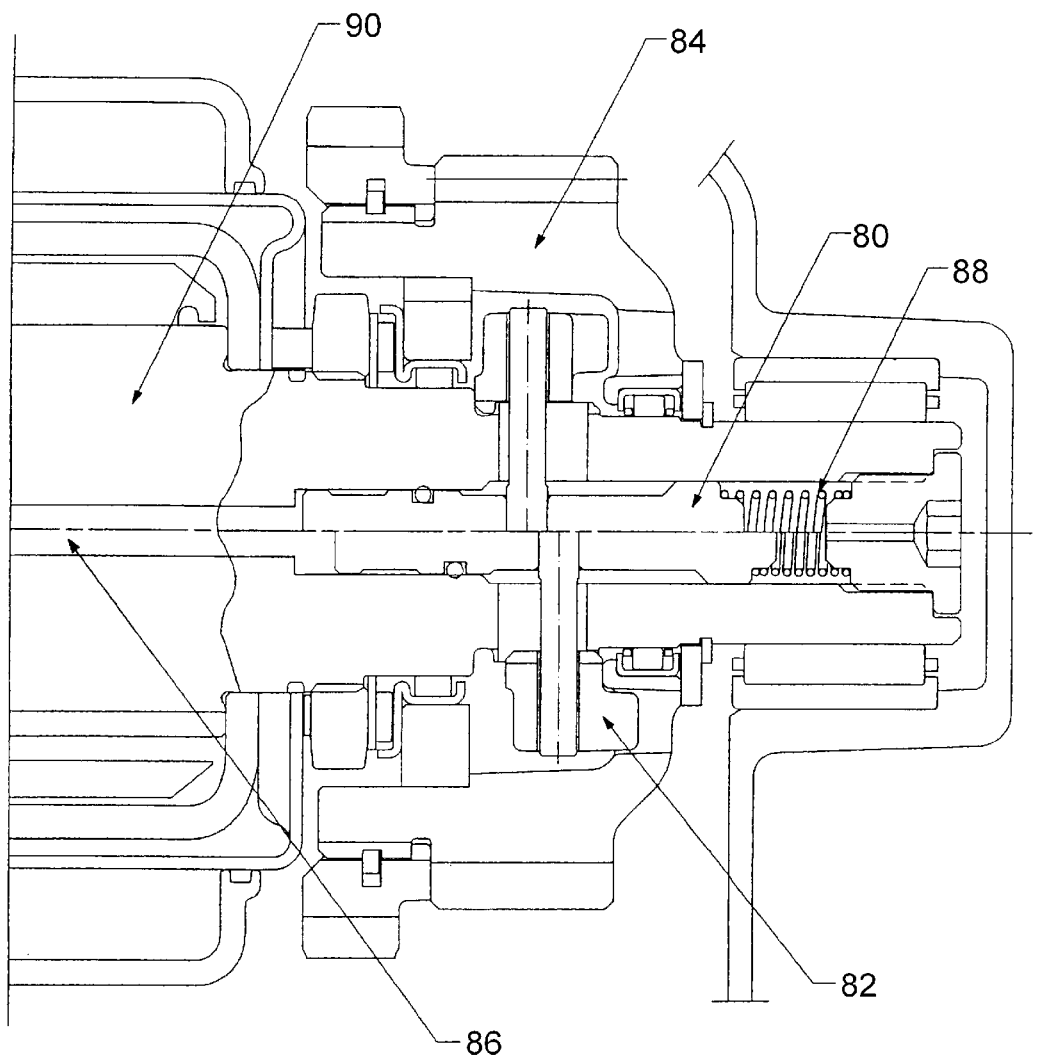
FIG. 3 is a cross-sectional view of a CVT transmission incorporating yet another embodiment of decoupling device.

FIG. 3 shows a decoupling device for an automatic transmission which has similar characteristics to that of FIG. 2. As with the view of FIG. 2, the upper half of FIG. 3 shows the decoupling device with no fluid pressure applied, while the lower half of FIG. 3 shows the decoupling device with fluid pressure applied.

Piston 80 is fixed to a dog clutch 82 which can engage a transfer pinion 84. One end of the piston 80 is coupled to a conduit 86 while at the other end of piston 80 there is provided a coil spring 88.

When no fluid pressure is applied in conduit 86, the piston is moved to the leftmost position shown in the upper half of FIG. 3 and the dog clutch 82 is disengaged from the transfer pinion 84. In this position, the engine output, coupled to shaft element 90, is disengaged from the vehicle driveline, coupled to the transfer pinion 84.

On the other hand, when fluid pressure is applied in the conduit 86, the piston 80 is moved against the force of the coil spring 88 to the rightmost position shown in the lower half of FIG. 3. In this position, the dog clutch 82 engages the transfer pinion 84, and torque transfer from the vehicle engine to the vehicle driveline is enabled.

It will be apparent in all the described embodiments that the engine output will be disengaged from the vehicle driveline when the engine is not operating, to enable the vehicle to be towed without risking damage to the transmission.

It will also be apparent to the skilled reader that each of the described embodiments could be used with any type of transmission, preferably an automatic or CVT transmission, to overcome some of the problems highlighted herein with those transmissions.

With the above-described embodiments, no or little additional axial space is required to install the decoupling device, and the outside configuration of the transmission is essentially unchanged.

They can provide a robust design and low number of parts, therefore optimum cost-to-benefit ratio.

Moreover, through adequate dimensioning, the clutch pack 14 may also provide a limiting torque device allowed to slip under torque spikes from the driveline, thus protecting the sensitive transmission elements, such as the belt, from overloads induced by the output shaft.

It will be apparent to the skilled person that modifications may be made to the described embodiments within the scope of the invention as defined in the claims.

What is claimed is:

1. A transmission assembly including an output shaft, a vehicle driveline, and a driven pulley sheave movable along the output shaft, a decoupling device installed on the driven pulley sheave and operable for disconnecting the vehicle driveline from the output shaft, the output shaft including a conduit for the supply of control fluid to the decoupling device, the decoupling device including at least one component located on or in the output shaft and controlled by fluid pressure provided through said conduit.

2. The transmission according to claim 1, wherein the transmission is continuously variable transmission and the decoupling device is formed in part by the driven pulley sheave.

3. The transmission according to claim 2 wherein the driven pulley sheave is reciprocatable along the output shaft, the decoupling device being operable to provide clamping force to the driven pulley sheave.

4. The transmission according to claim 1, including at least one spring element which biases the decoupling device into the disconnecting position.

5. The transmission according to claim 1, wherein the decoupling device disconnects the vehicle driveline from the output shaft through a multi-plate clutch in the vehicle driveline.

6. The transmission assembly of claim 1, wherein the decoupling device is configured to provide clamping force to the driven pulley sheave.

7. The transmission assembly of claim 5, wherein the decoupling device is configured to provide apply force to the multi-plate clutch.

8. A vehicle including an engine and the transmission assembly according to claim 1, wherein the conduit is coupled to the vehicle engine such that the control fluid therein is pressurized on the basis of engine output.

* * * * *